United States Patent Office 3,419,472
Patented Dec. 31, 1968

3,419,472
PROCESS FOR PREPARING STREPTOKINASE-RICH MATERIAL
Pentti Kasper Siiteri, Dallas, Tex., and Richard Douglas Mills, Pearl River, N.Y., assignors to American Cyanamid Company, Stamford, Conn., a corporation of Maine
No Drawing. Original application Oct. 24, 1960, Ser. No. 64,655, now Patent No. 3,226,304, dated Dec. 28, 1965. Divided and this application Sept. 20, 1965, Ser. No. 488,752
The portion of the term of the patent subsequent to Dec. 28, 1982, has been disclaimed
18 Claims. (Cl. 195—68)

This application is a division of our copending application Ser. No. 64,655, filed Oct. 24, 1960, now U.S. Patent 3,226,304, issued Dec. 28, 1965, which in turn is a continuation-in-part of our copending application Ser. No. 711,867, filed Jan. 29, 1958, now abandoned.

This invention relates to preparing streptokinase-rich material from relatively impure sources thereof.

Streptokinase, a substance capable of activating plasminogen to plasmin which has fibrinolytic activity, is produced by many strains of hemolytic streptococci, chiefly those of Group A and Lancefield Group C streptococci.

With a view toward separating streptokinase from other and frequently undesirable co-produced metabolic by-products so as to obtain a streptokinase-rich material for potential as yet untried procedures in the control of thrombo-embolic disease and related disease, numerous prior art efforts have fallen short of providing an especially rich product. In contrast, the present invention relatively speaking, makes possible a material exceptionally rich in streptokinase.

We have found unexpectedly that a streptokinase material free to a remarkable and heretofore unattained degree, may be obtained by means of a one-cycle adsorption-elution process employing a cellulose amine anion exchanger and phosphate buffer under carefully controlled conditions. The resulting material is useful in medicinal applications where streptokinase type activity acts to enchance fibrinolysis at the site of an injury.

The process of our invention is based on the general principle of adsorption chromatography as applied to anion exchange column adsorbants. The column adsorbants may be prepared from commercial cellulose by the successive steps of treating it with alkali to render it more reactive and treating the activated cellulose with an aqueous solution of a reactive amine to provide for ionizable substituent groups being attached to the cellulose moiety by way of ether linkages. For example, the reactive amine may be 2-chlorotriethylamine. The modified cellulose thus obtained is washed in turn with aqueous alkali solution, mild aqueous acid solution, again with mild aqueous alkali solution and finally with water. The nitrogen content (Dumas Method) of the resultant water-washed and dried modified cellulose is of the order of about 1% nitrogen, although any such product assaying between 0.7 and 1.5% may be used satisfactorily. The modified cellulose material may be further characterized by its ion exchange capacity as determined by direct titration against standard hydrochloric acid solution. For instance, a normal product of this type will titrate about 0.71 milliequivalent per gram of the modified cellulose. The modified cellulose may be used in columns of from 1 cm. and greater in diameter with the height of the column bed being approximately ten to fifteen times its diameter. Before the modified cellulose is put in the column, however, it is conditioned by slurrying in water and adjusting the pH thereof to an arbitrary value with an aqueous acidic reagent. It is then further conditioned by washing with buffer solution of the same arbitrary pH. The buffered cellulose slurry is poured into the column, allowed to settle by gravity and finally packed with the aid of compressed air. The column is then ready for use.

A solution of crude streptokinase material that has been dialyzed against a portion of the identical buffer solution used in the conditioning of the modified cellulose is now placed on top of the column bed and allowed to flow into the column by gravity. After the streptokinase solution has completely flowed into the column bed an arbitrary amount of the same buffer solution is placed on top of the column bed to provide a head of fluid above the column bed. Simultaneously, the desorption of the adsorbed streptokinase activity is begun by means of standard elution technique whereby a buffer is introduced at the top of the column and the effluent from the column is collected in successive fractions. As this buffer flows through the column, the streptokinase activity moves down the column and finally is recovered from the bottom of the column in the form of a dilute aqueous solution.

The type of buffer used to purify streptokinase by the above-described process is very critical. We have found that only the phosphate type is suitable for our purpose.

The molarity of the phosphate buffer used to condition the column bed prior to commencement of elution is also critical, the permissible maximum value being 0.1 M. Molarity greater than 0.1 will prevent proper adsorption of streptokinase activity by the modified cellulose bed and thereby result in improper separation of streptokinase from impurities associated therewith. Below 0.005 M the streptokinase activity is not desorbed properly.

The pH of the phosphate buffer solution used to condition the modified cellulose column should be kept between about 5.8 and 8.5. Above about pH 8.5 the ionization characteristics of the modified cellulose are gradually suppressed and, consequently, the capacity of the cellulose to adsorb streptokinase is concomitantly suppressed. Below about pH 5.8 streptokinase itself tends to precipitate inasmuch as its isoelectric point is in that range.

The temperature range within which the elution technique described above may be applied successfully to crude streptokinase material is 0° C. to 10° C. The preferred range is 3° C. to 5° C. Above 10° C. denaturation of streptokinase appears to take place.

While, as stated above, the standard elution technique may be used, in a preferred embodiment of the process of our invention gradient elution is employed. As is well known, in gradient elution a buffer of gradually changing pH and/or molar strength is introduced into the column for purposes of elution.

The extent to which the molarity of the phosphate buffer solution may vary during the gradient elution process is considerable, a top value of about 0.4 being considered a practical upper limit. It must vary to some extent, however, in order for the process to be successful. The pH may vary from a preferred starting value of between 6.0 to 6.5 to about 8.5 on the high side and 5.8 on the low side, for the reasons outlined above concerning the pH limitations of the buffer solution used to condition the column at the outset. The flow rate through the column is not critical but a value recommended is 3 ml./sq. cm. of cross-sectional area/hour.

Regarding the starting material useful for the process of our invention, it is to be understood that the term "crude streptokinase" is meant "streptokinase-bearing material" such as ordinary commercially available streptokinase-streptodornase mixtures as well as the up-graded streptokinase material prepared by the process claimed in U.S. Patent 2,784,145 to Ablondi and Mills. Numerous other partially purified streptokinase preparations, such as those that would occur to one skilled in the art, would likewise be suitable starting materials for our process.

The following examples will serve to illustrate the scope of our invention with more particularity.

EXAMPLE 1

137 grams of crude streptokinase assaying about 80 streptokinase units per gamma of nitrogen were suspended in water and brought into solution by the addition of dilute sodium hydroxide. This solution was dialyzed against 0.05 sodium phosphate at pH 6.5. The solution was removed from the dialysis bag and a small amount of insoluble material was removed by centrifugation. The volume of this solution was 485 ml. and it contained 305 million streptokinase units. The dialyzed solution was divided into two equal portions and each portion was allowed to run by gravity into two identical columns prepared with a cellulose anion exchanger which had been made by reacting cellulose with 2-chlorotriethylamine. These columns had an internal diameter of 3.7 cms. and the height of the column bed was approximately 40 cms. Gradient elution with increasing pH and molar strength was used to remove the streptokinase activity from the columns by the constant column technique. Both mixing bottle and reservoir of the gradient device were of similar shape and cross-sectional area. The mixing bottle contained 1800 mls. of 0.05 M phosphate buffer at pH 6.5 and the reservoir contained 1800 mls. of solution which was 0.1 M with respect to $Na_2HPO_4$ and 0.2 M with respect to NaCl. The flow rate through the columns was approximately 3 ml./sq. cm. per hour. The streptokinase-rich fraction from each column contained approximately 145 million streptokinase units. Two additional columns were run in a similar manner starting with 180 grams of crude streptokinase. The streptokinase-rich fractions from these four columns were combined and the streptokinase was precipitated therefrom by the addition of 10% sodium chloride and adjustment of the pH of the solution to a value of 4.0.

EXAMPLE 2

34 grams of crude streptokinase assaying 100 streptokinase units per gamma of nitrogen were purified by batch-wise adsorption and elution at pH 7.0 from a modified cellulose anion exchanger, the exchanger as fully described in Example 1. Further purification of this partially purified streptokinase was achieved by gradient elution chromatography on the same type of modified cellulose as follows: A solution of the partially purified streptokinase was dialyzed against 0.075 M sodium phosphate at pH 6.0 and then allowed to flow into a column of cellulose anion exchanger. The inside diameter of this column was 3.7 cm. and the height of the column was 55 cm. Gradient elution of the streptokinase was achieved by a system in which the mixing bottle contained 2000 ml. of 0.075 M sodium phosphate at pH 6.0 and the reservoir contained 200 ml. of a solution that was 0.2 M with respect to both $NaH_2PO_4$ and NaCl.

EXAMPLE 3

25 grams of crude streptokinase assaying about 150 streptokinase units per gamma of nitrogen were suspended in water and dissolved by the addition of dilute sodium hydroxide. This solution was dialyzed against 0.04 M phosphate buffer, pH 7.0, until the pH inside the dialyzing bag was 7.0 and the phosphate buffer concentration was 0.04 M. The volume of this solution was 70 ml. and it contained 122.6 million units of streptokinase. The dialyzed solution was allowed to run by gravity into a column of modified cellulose anion exchanger. The column had an internal diameter of 3.7 cms. and the height of the column was 46.0 cms. Elution of impurities was achieved by passing about 800 ml. of 0.075 M phosphate buffer, pH 8.0, through the column, under which conditions the streptokinase is not yet desorbed. Flow rate was as described in previous examples. When the impurities were eluted the elution with 0.075 M phosphate buffer was discontinued and elution of the streptokinase begun by flowing 0.1 M phosphate buffer, pH 7.0, through the column. About 800 ml. of this buffer were used for elution. The streptokinase-rich fraction containing 93 million units was collected.

We claim:

1. A one-cycle adsorption-elution process for preparing streptokinase-rich material from relatively impure sources thereof which consists in the steps of
    (a) adsorbing crude streptokinase on a cellulose amine anion exchanger and
    (b) desorbing purified streptokinase therefrom by means of elution,
said preceding steps taking place in the presence of a phosphate buffer system having a pH value of not less than about 5.8 and not more than about 8.5, a temperature of not less than 0° C. and not more than 10° C., and a molarity of not less than about 0.005 and during said adsorbing step of not more than about 0.1 and during said desorbing step of not more than about 0.4, and recovering the streptokinase-rich material from the eluate.

2. The process of claim 1 wherein said elution is a gradient elution.

3. The process of claim 1 wherein said elution is a two-stage elution conducted firstly with said system adjusted to about 0.075 M phosphate and about pH 8 to remove impurities and secondly with said system adjusted to about 0.1 M phosphate and about pH 7 to remove streptokinase-rich material.

4. The process of claim 2 wherein said cellulose amine anion exchanger is used in the form of a column.

5. The process of claim 3 wherein said cellulose amine anion exchanger is used in the form of a column.

6. The process of claim 4 wherein said temperature is not less than 3° C. and not more than 5° C.

7. The process of claim 5 wherein said temperature is not less than 3° C. and not more than 5° C.

8. The process of claim 4 wherein the cellulose amine anion exchanger comprises the reaction product of activated cellulose with 2-chlorotriethylamine.

9. The process of claim 5 wherein the cellulose amine anion exchanger comprises the reaction product of activated cellulose with 2-chlorotriethylamine.

10. A one-cycle adsorption-elution process for purifying streptokinase which consists essentially in
    (a) bringing into contact with a cellulose amine anion exchanger a solution of streptokinase in a phosphate buffer having a molar concentration of from 0.005 to 0.1 and
    (b) contacting the cellulose amine anion exchanger with a phosphate buffer having a molar concentration between 0.005 and 0.4 to selectively remove streptokinase,
said phosphate buffer having a pH value of not less than about 5.8 and not more than about 8.5 and a temperature of not less than 0° C. and not more than 10° C.

11. The process of claim 10 wherein the cellulose amine anion exchanger is used in the form of a column.

12. The process of claim 10 wherein the temperature is not less than 3° C. and not more than 5° C.

13. The process of claim 10 wherein the cellulose amine anion exchanger comprises the reaction product of activated cellulose and 2-chlorotriethylamine.

14. The process of claim 10 wherein the selective removal of streptokinase includes the use of gradient elution technique.

15. A one-cycle adsorption-elution process for purifying streptokinase which consists essentially in
    (a) bringing into contact with a cellulose amine anion exchanger a solution of streptokinase in a phosphate buffer having a molar concentration of from 0.005 to 0.1, (b) washing the cellulose amine anion exchanger with a phosphate buffer having a molar concentration of approximately 0.075 to remove impurities, and (c) removing streptokinase from the cellulose amine anion exchanger with a phosphate buffer having a molar concentration of about 0.1, said phosphate buffer having a pH value of not less than about 5.8 and not more than about 8.5 and a temperature of not less than 0° C. and not more than 10° C.

16. The process of claim 15 wherein the cellulose amine anion exchanger is used in the form of a column.

17. The process of claim 15 wherein the temperature is not less than 3° C. and not more than 5° C.

18. The process of claim 15 wherein the cellulose amine anion exchanger comprises the reaction product of activated cellulose and 2-chlorotriethylamine.

References Cited

UNITED STATES PATENTS 3,226,304  12/1965  Siiteri et al. _____ 195

ALBERT T. MYERS, *Primary Examiner.*

S. J. FRIEDMAN, *Assistant Examiner.*

U.S. Cl. X.R.

424—94